US008405359B2

(12) United States Patent
Tange et al.

(10) Patent No.: US 8,405,359 B2
(45) Date of Patent: Mar. 26, 2013

(54) BATTERY PROTECTION IC AND BATTERY DEVICE

(75) Inventors: Yoshihisa Tange, Chiba (JP); Atsushi Sakurai, Chiba (JP); Takakazu Ozawa, Chiba (JP); Kiyoshi Yoshikawa, Chiba (JP)

(73) Assignee: Seiko Instruments Inc., Chiba (JP)

( * ) Notice: Subject to any disclaimer, the term of this patent is extended or adjusted under 35 U.S.C. 154(b) by 387 days.

(21) Appl. No.: 12/596,269

(22) PCT Filed: Jul. 3, 2008

(86) PCT No.: PCT/JP2008/062024
§ 371 (c)(1),
(2), (4) Date: Oct. 16, 2009

(87) PCT Pub. No.: WO2009/008313
PCT Pub. Date: Jan. 15, 2009

(65) Prior Publication Data
US 2010/0060084 A1    Mar. 11, 2010

(30) Foreign Application Priority Data

Jul. 6, 2007   (JP) .................................. 2007-178838

(51) Int. Cl.
*H02J 7/00* (2006.01)
*H02J 7/16* (2006.01)

(52) U.S. Cl. ........ 320/134; 320/135; 320/136; 320/137; 320/148; 320/116

(58) Field of Classification Search .................. 320/134, 320/116, 137, 135, 136, 107, 148, 149, 156, 320/157, 160, 161, 162
See application file for complete search history.

(56) References Cited

U.S. PATENT DOCUMENTS

| 5,789,900 A | * | 8/1998 | Hasegawa et al. ............ 320/132 |
| 5,808,444 A | * | 9/1998 | Saeki et al. .................... 320/117 |
| 5,929,593 A | * | 7/1999 | Eguchi .......................... 320/139 |

(Continued)

FOREIGN PATENT DOCUMENTS

| JP | 2003-111294 A | 4/2003 |
| JP | 2005-117780 A | 4/2005 |
| JP | 2005-134154 A | 5/2005 |
| JP | 2005-318736 A | 11/2005 |

OTHER PUBLICATIONS

Extended European Search Report for European Application No. 08790828.1, dated Sep. 17, 2010, 5 pages.
International Search Report for International Application No. PCT/JP2008/062024, dated Sep. 2, 2008, 1 page.

*Primary Examiner* — Edward Tso
*Assistant Examiner* — Alexis Boateng
(74) *Attorney, Agent, or Firm* — Brinks Hofer Gilson & Lione

(57) ABSTRACT

Provided are a battery protection IC adaptable to any number of batteries connected in series without increasing a breakdown voltage thereof, and a battery device including the battery protection IC mounted thereon. A charge control signal input terminal and a discharge control signal input terminal of one battery protection IC are provided with a clamp circuit (121), and hence an output driver (112) of another battery protection IC connected to those terminals is not applied with a voltage equal to or higher than a breakdown voltage. Accordingly, the breakdown voltage of the battery protection IC is not required to be high.

7 Claims, 3 Drawing Sheets

U.S. PATENT DOCUMENTS

| | | | |
|---|---|---|---|
| 2004/0164711 A1* | 8/2004 | Hayashi | 320/134 |
| 2005/0242779 A1* | 11/2005 | Yoshio | 320/134 |
| 2005/0242780 A1 | 11/2005 | Sakuma et al. | |
| 2006/0255768 A1* | 11/2006 | Yoshio | 320/134 |
| 2007/0096695 A1* | 5/2007 | Kimura et al. | 320/134 |
| 2007/0188149 A1* | 8/2007 | Miyamoto | 320/134 |
| 2008/0238370 A1* | 10/2008 | Carrier et al. | 320/134 |
| 2009/0184682 A1* | 7/2009 | Kosugi et al. | 320/134 |

\* cited by examiner

BATTERY PROTECTION IC AND BATTERY DEVICE

TECHNICAL FIELD

The present invention relates to a battery protection IC for protecting a battery, and to a battery device including a plurality of the battery protection ICs mounted thereon.

BACKGROUND ART

Nowadays, mobile electronic devices are widespread. This type of electronic device is usually driven by a battery device including a battery and a battery protection IC for protecting the battery mounted thereon. Through series connection or parallel connection of a plurality of batteries, the battery device generates a power supply voltage of a mobile electronic device, which is required for the mobile electronic device, and the mobile electronic device is operated by the power supply voltage thus generated.

Here, there is proposed a battery protection IC adaptable to any number of batteries connected in series. In the proposed battery protection IC, a plurality of battery protection ICs for protecting a block of a plurality of batteries are used, and the plurality of battery protection ICs are connected in cascade to communicate with each other (for example, see Patent Document 1).

Patent Document 1: JP 2005-117780 A

DISCLOSURE OF THE INVENTION

Problem to be Solved by the Invention

However, in the technology disclosed in Patent Document 1, at a maximum, a total of battery voltages of all the batteries connected in series is applied to preset transistors (for example, transistors of an output stage) included in the respective battery protection ICs. As a result, a breakdown voltage of the battery protection IC for the total of battery voltages is required.

The present invention has been made in view of the above-mentioned problem, and therefore provides a battery protection IC adaptable to any number of batteries connected in series without increasing a breakdown voltage thereof, and a battery device including a plurality of the battery protection ICs mounted thereon.

Means for Solving the Problem

In order to solve the above-mentioned problem, the present invention provides a battery protection IC for protecting a battery, including: a charge control signal output terminal for outputting a charge control signal which controls charging from a charger to the battery; a voltage monitoring circuit for monitoring a battery voltage of the battery, and detecting, when the battery voltage becomes equal to or higher than an overcharge detection voltage, that the battery voltage becomes equal to or higher than the overcharge detection voltage to output a detection signal; an output driver of a first conductivity type for being turned off to cut off a charge current when the detection signal is output; a charge control signal input terminal for receiving input of the charge control signal, the charge control signal input terminal being connected with a resistor in an outside thereof; a transistor of the first conductivity type for being turned off when a voltage of the charge control signal input terminal is pulled to a source voltage side by a voltage generated in the resistor, and being turned on when the charge control signal input terminal is opened or HIGH is input to the charge control signal input terminal; and a clamp circuit for clamping a gate voltage of the transistor to a predetermined voltage, the output driver being turned on when the transistor is turned off, and being turned off when the transistor is turned on to cut off the charge current.

Effects of the Invention

According to the present invention, the charge control signal input terminal of one battery protection IC is provided with the clamp circuit, whereby an output driver of another battery protection IC, which is connected to this terminal, is not applied with a voltage equal to or higher than a breakdown voltage. Hence, a breakdown voltage of the battery protection IC is not required to be high.

BEST MODE FOR CARRYING OUT THE INVENTION

Hereinafter, an embodiment of the present invention is described with reference to the drawings.

Figure 1:
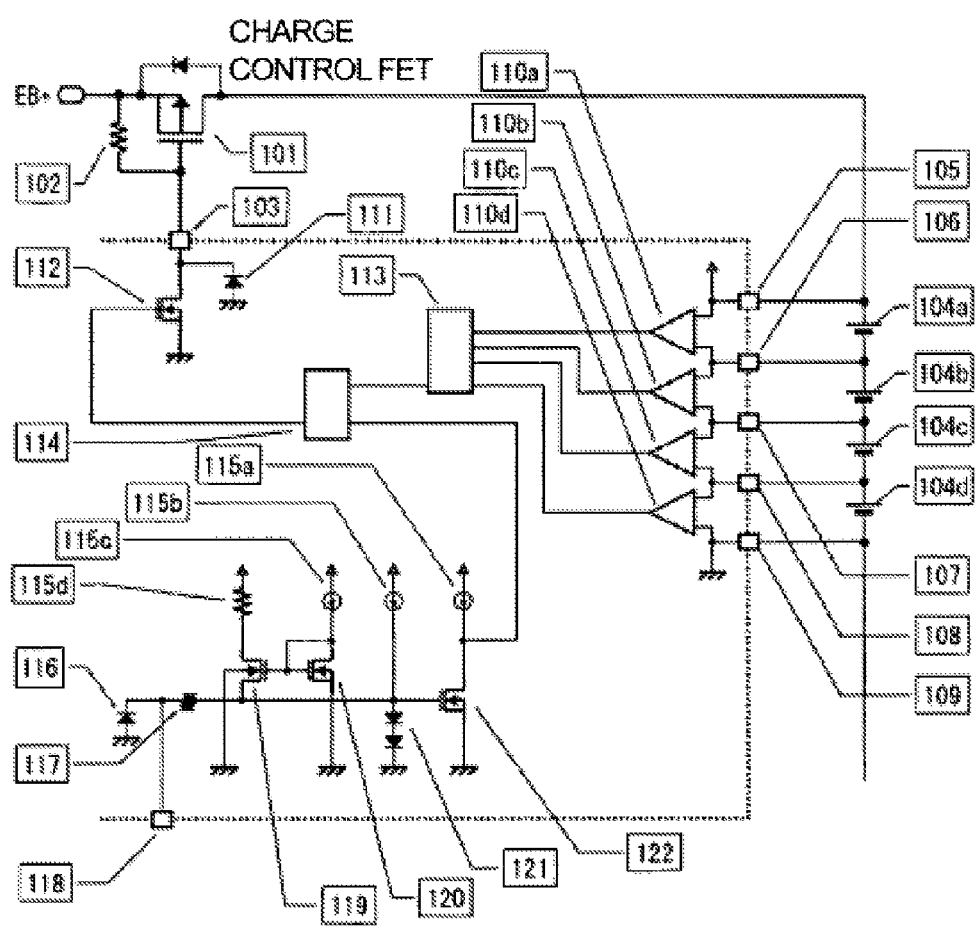
FIG. 1 is a diagram illustrating a battery protection IC.

First, a configuration of a battery protection IC is described. FIG. 1 is a diagram illustrating the battery protection IC.

The battery protection IC monitors battery voltages of batteries 104a to 104d such as lithium ion batteries, and protects the batteries 104a to 104d.

The battery protection IC includes a charge control signal output terminal 103, a charge control signal input terminal 118, and battery connection terminals 105 to 109. In addition, the battery protection IC includes voltage monitoring circuits 110a to 110d and a control circuit 113. The battery protection IC also includes constant current circuits 115a to 115c, a resistor 115d, NMOSs 119 and 120, an NMOS 122, a protection element 116, a resistor 117, and a clamp circuit 121. Moreover, the battery protection IC includes a control circuit 114, a protection element 111, and an output driver 112.

The voltage monitoring circuits 110a to 110d are connected to the batteries 104a to 104d through the battery connection terminals 105 to 109, respectively. Output terminals of the voltage monitoring circuits 110a to 110d are connected to an input terminal of the control circuit 113. An output terminal of the control circuit 113 is connected to an input terminal of the control circuit 114.

The charge control signal input terminal 118 is connected to a cathode of the protection element 116, to a source of the NMOS 119 through the resistor 117, to an anode of the clamp circuit 121, and to a gate of the NMOS 122. The cathode of the protection element 116 and a cathode of the clamp circuit 121 are connected to a ground terminal. Sources of the NMOS 120 and the NMOS 122 are connected to the ground terminal. A gate of the NMOS 119 is connected to a gate and a drain of the NMOS 120. The resistor 115d is provided between a power supply terminal and a drain of the NMOS 119, the constant current circuit 115c is provided between the power supply terminal and the drain of the NMOS 120, the constant current circuit 115b is provided between the power supply terminal and the anode of the clamp circuit 121, and the constant current circuit 115a is provided between the power supply terminal and a drain of the NMOS 122. The drain of the NMOS 122 is connected to the input terminal of the control circuit 114.

An output terminal of the control circuit 114 is connected to a gate of the NMOS 112. A source of the NMOS 112 is connected to the ground terminal, and a drain of the NMOS 112 is connected to the charge control signal output terminal 103 and a cathode of the protection element 111. An anode of the protection element 111 is connected to the ground terminal. A charge control signal for controlling charging, which is output from the charge control signal output terminal 103, controls ON/OFF of a charge control FET 101.

Next, a description is given of an operation of controlling charging from a charger (not shown) to the batteries 104a to 104d performed by the battery protection IC at the time of overcharging.

The voltage monitoring circuits 110a to 110d monitor the battery voltages of the batteries 104a to 104d, respectively. When the battery voltage of at least one battery is equal to or higher than an overcharge detection voltage (voltage at which charging is prohibited due to overcharging), at least one of the voltage monitoring circuits detects the above. The relevant voltage monitoring circuit outputs a detection signal to the gate of the output driver 112 through the control circuits 113 and 114. Then, the output driver 112 is turned off. The charge control signal output terminal 103 outputs the charge control signal to a gate of the charge control FET 101. A gate voltage of the charge control FET 101 is pulled up by a resistor 102 to a charger voltage of the charger connected to an EB+ terminal. Accordingly, the charge control FET 101 is turned off, and thus a charge current is cut off.

When the charge control signal is input to the charge control signal input terminal 118 and a signal having a higher threshold compared with the NMOS 122 is applied to the gate of the NMOS 122 through the charge control signal input terminal 118 and the resistor 117, the NMOS 122 is turned on. Then, voltages of the input terminal and the output terminal of the control circuit 114 become low, and therefore a gate voltage of the output driver 112 becomes low. Accordingly, the output driver 112 is turned off. The charge control signal output terminal 103 outputs the charge control signal to the gate of the charge control FET 101. The gate voltage of the charge control FET 101 is pulled up by the resistor 102 to the charger voltage of the charger connected to the EB+ terminal. Accordingly, the charge control FET 101 is turned off, whereby the charge current is cut off. As described above, the charge control signal input terminal 118 is controlled from the outside, whereby the battery protection IC can control charging. It should be noted that irrespective of whether or not the detection signal is output from the voltage monitoring circuits 110a to 110d, when the charge control signal is input to the charge control signal input terminal 118, the charge current is cut off.

Next, a description is given of an operation of controlling discharging from the batteries 104a to 104d to a load (not shown) performed by the battery protection IC at the time of overdischarging.

Two of the circuits described above (not shown) which include the charge control FET 101, the resistor 102, a discharge control FET, and a resistor, and is used for controlling charging are provided in the battery protection IC. One of the above-mentioned two circuits for controlling charging is operated to control charging at the time of overcharging in the manner as described above, and another thereof is operated to control discharging at the time of the overdischarging. In the case of controlling charging, when the battery voltage of the battery is equal to or higher than an overcharge voltage, the voltage monitoring circuit detects the above, thereby controlling charging. In the case of controlling discharging, when the battery voltage of the battery is lower than an overdischarge voltage (voltage at which discharging is prohibited due to overdischarging), the voltage monitoring circuit detects the above, thereby controlling discharging. The battery protection IC can control discharging as well as charging with the use of the two circuits described above.

Next, a description is given of an operation of the battery protection IC at the time of normal operation in which the battery voltages of all the batteries are equal to or higher than an overdischarge detection voltage and lower than an overcharge detection voltage.

All the voltage monitoring circuits do not output detection signals to the gate of the output driver 112 through the control circuits 113 and 114. OLE_LINK3 Accordingly, the output driver 112 is turned on. The gate voltage of the charge control FET 101 becomes a ground voltage of the battery protection IC. Therefore, the charge control FET 101 is turned on, and thus the charge current is not cut off. OLE_LINK3 Moreover, the battery protection IC controls discharging as well as charging, and the discharge control FET (not shown) is turned on, and thus the discharge current is not cut off.

Here, through the use of the fact that the charge control signal input terminal 118 and a discharge control signal input terminal are controlled to control charging and discharging, when a plurality of battery protection ICs are connected in cascade, further plurality of batteries can be protected.

Figure 2:
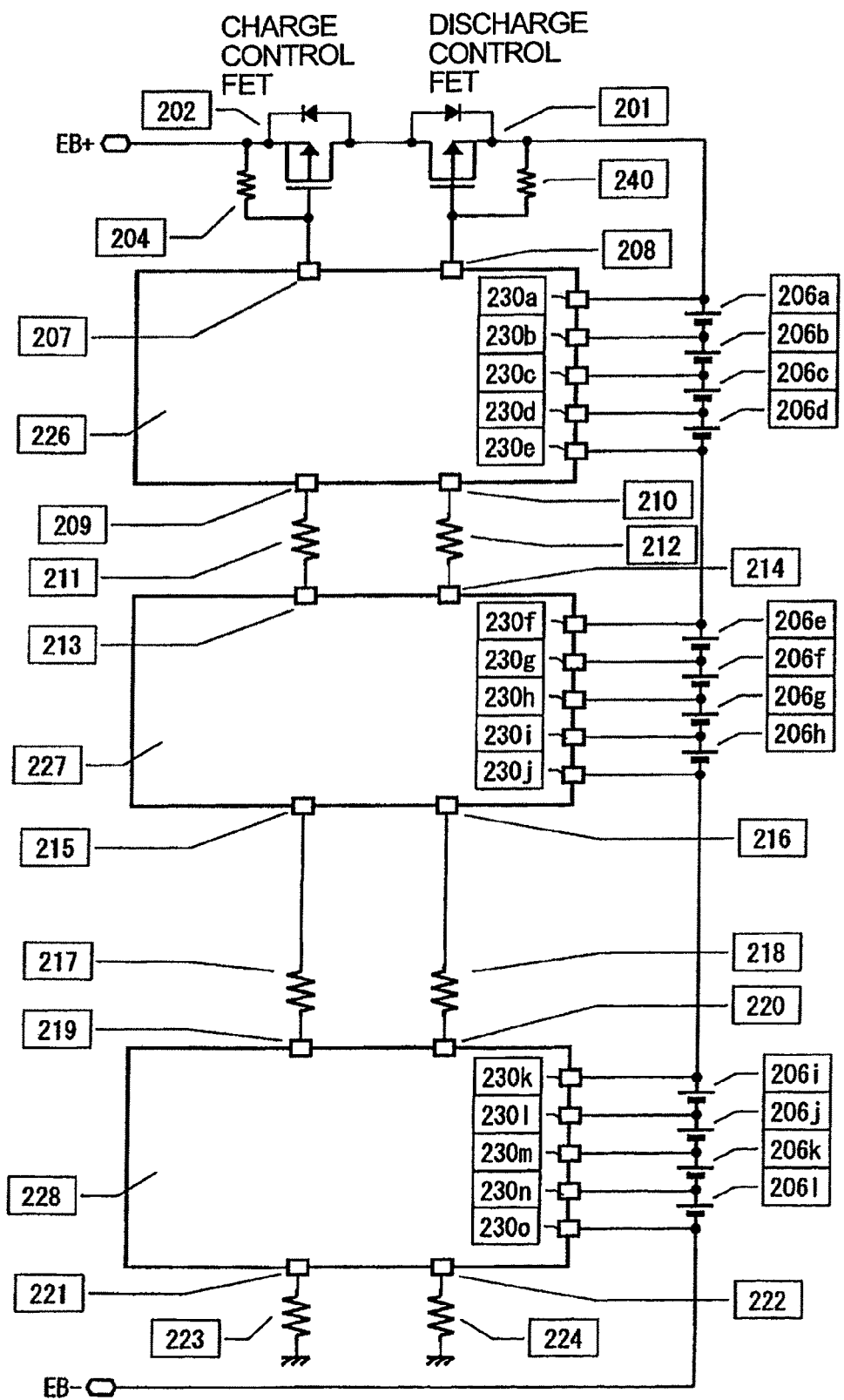
FIG. 2 is a diagram illustrating a battery device including a plurality of battery protection ICs connected in cascade.

Next, a description is given of a configuration of a battery device including a plurality of battery protection ICs connected in cascade thereon. FIG. 2 is a diagram illustrating a battery device including a plurality of battery protection ICs connected in cascade.

The battery device includes an external terminal EB+ and an external terminal EB−. In addition, the battery device includes a resistor 204, a resistor 240, a p-type charge control FET 202, a p-type discharge control FET 201, and batteries 206a to 206l. Moreover, the battery device includes battery protection ICs 226 to 228, resistors 211 and 212, resistors 217 and 218, and resistors 223 and 224.

In the battery protection IC 228, a charge control signal input terminal 221 is connected to a ground terminal of the battery protection IC 228 through the resistor 223, and a discharge control signal input terminal 222 is connected to the ground terminal of the battery protection IC 228 through the resistor 224. Further, the battery 206i is connected between a battery connection terminal 230k and a battery connection terminal 230l, the battery 206j is connected between the battery connection terminal 230l and a battery connection terminal 230m, the battery 206k is connected between the battery connection terminal 230m and a battery connection terminal 230n, and the battery 206l is connected between the battery connection terminal 230n and a battery connection terminal 230o. The batteries 206i to 206l are connected in parallel with the battery protection IC 228.

In the battery protection IC 227, a charge control signal input terminal 215 is connected to a charge control signal output terminal 219 through the resistor 217, and a discharge control signal input terminal 216 is connected to a discharge control signal output terminal 220 through the resistor 218. Further, the battery 206e is connected between a battery connection terminal 230f and a battery connection terminal 230g, the battery 206f is connected between the battery connection terminal 230g and a battery connection terminal 230h, the battery 206g is connected between the battery connection terminal 230h and a battery connection terminal 230i, and the battery 206h is connected between the battery connection terminal 230i and a battery connection terminal 230j. The batteries 206e to 206h are connected in parallel with the battery protection IC 227.

In the battery protection IC 226 of the uppermost stage, a charge control signal input terminal 209 is connected to a charge control signal output terminal 213 through the resistor 211, and a discharge control signal input terminal 210 is connected to a discharge control signal output terminal 214 through the resistor 212. Further, the battery 206a is connected between a battery connection terminal 230a and a battery connection terminal 230b, the battery 206b is connected between the battery connection terminal 230b and a battery connection terminal 230c, the battery 206c is connected between the battery connection terminal 230c and a battery connection terminal 230d, and the battery 206d is connected between the battery connection terminal 230d and a battery connection terminal 230e. The batteries 206a to 206d are connected in parallel with the battery protection IC 226. Further, a gate of the charge control FET 202 is connected to a charge control signal output terminal 207 and the external terminal EB+ through the resistor 204, and a gate of the discharge control FET 201 is connected to a discharge control signal output terminal 208 and a positive terminal of the battery 206a through the resistor 240. In the battery protection IC 226, a charge control signal output from the charge control signal output terminal 207 controls ON/OFF of the charge control FET 202, and a discharge control signal, which is output from the discharge control signal output terminal 208 and is used for controlling discharging, controls ON/OFF of the discharge control FET 201.

The external terminal EB+ is connected to the positive terminal of the battery 206a through the charge control FET 202 and the discharge control FET 201. The batteries 206a to 206l are connected in series. A negative terminal of the battery 206l is connected to the external terminal EB−.

Further, there is provided a load (not shown) driven by a charger charging the batteries 206a to 206l or the batteries 206a to 206l between the external terminal EB+ and the external terminal EB−.

Next, a description is given of an operation of the battery device in the normal operation.

When the battery voltages of the batteries 206a to 206l are normal, the output drivers 112 of the battery protection IC 228, the battery protection IC 227, and the battery protection IC 226 are turned on.

In a relation between the battery protection IC 228 and the battery protection IC 227, when the output driver 112 of the battery protection IC 228 is turned on, a source voltage (voltage of the charge control signal input terminal 215) of the NMOS 119 of the battery protection IC 227 is pulled to the source voltage side (ground voltage side of the battery protection IC 228). Therefore, a differential voltage between a gate voltage and the source voltage of the NMOS 119 included in the battery protection IC 227 increases, whereby a current flowing through the NMOS 119 increases. Accordingly, a current flowing through the resistor 115d of the battery protection IC 227 flows into the ground terminal of the battery protection IC 228 through the NMOS 119 of the battery protection IC 227, the resistor 117 of the battery protection IC 227, the resistor 217, and the NMOS 112 of the battery protection IC 228. A voltage is generated in the resistor 117 of the battery protection IC 227 and the resistor 217 based on the ground voltage of the battery protection IC 228, and due to the generated voltage, a voltage between the gate and the source of the NMOS 122 included in the battery protection IC 227 decreases to be lower than the threshold voltage of the NMOS 122, whereby the NMOS 122 is turned off. Then, voltages of the input terminal and the output terminal of the control circuit 114 included in the battery protection IC 227 become high, and the gate voltage of the output driver 112 included in the battery protection IC 227 becomes high. Then, as expected, the output driver 112 of the battery protection IC 227 is turned on.

In a relation between the battery protection IC 227 and the battery protection IC 226, when the output driver 112 of the battery protection IC 227 is turned on, as expected, the output driver 112 of the battery protection IC 226 is also turned on.

A gate voltage of the charge control FET 202 becomes the ground voltage of the battery protection IC 226. Accordingly, the charge control FET 202 is turned on, and the charge current is not cut off. In this manner, when the charge control signal input terminal, the discharge control signal input terminal, the charge control signal output terminal, and the discharge control signal output terminal are used, signals are exchanged between the respective battery protection ICs.

Further, the battery device can control discharging as well as charging, and hence the discharge control FET 201 is turned on and a discharge current is not cut off.

Here, depending on a current value of the current flowing through the resistor 115d of the battery protection IC 227 and a resistance value of the resistor 217, in some cases, a current flows from a ground terminal of the battery protection IC 227 to the ground terminal of the battery protection IC 228 through the protection element 116, the resistor 217, and the output driver 112 of the battery protection IC 228. In other words, a forward current flows through the protection element 116 in some cases. When the forward current flows, the protection element 116 may be damaged in some cases. Therefore, as to the current value of the current flowing through the resistor 115d of the battery protection IC 227 and the resistance value of the resistor 217, the circuit is designed so that the forward current is prevented from flowing through the protection element 116 and damaging the protection element 116.

Next, a description is given of an operation of the battery device at the time of overdischarging.

When the battery voltages of the batteries 206a to 206h are normal, the output drivers 112 of the battery protection IC 227 and the battery protection IC 226 are turned on. When the battery voltages of the batteries 206i to 206l are equal to or higher than the overcharge detection voltage, the output driver 112 of the battery protection IC 228 is turned off. In other words, the charge control signal input terminal 215 is opened.

The voltage of the charge control signal input terminal 215 is likely to increase to around a power supply voltage of the battery protection IC 227 by means of the constant current circuit 115b of the battery protection IC 227. When the voltage of the charge control signal input terminal 215 becomes equal to or higher than the threshold voltage of the NMOS 122 included in the battery protection IC 227, the NMOS 122 is turned on, the voltages of the input terminal and the output terminal of the control circuit 114 of the battery protection IC 227 become low, and the gate voltage of the output driver 112 of the battery protection IC 227 becomes low. As a result, the output driver 112 of the battery protection IC 227 is turned off.

When the output driver 112 of the battery protection IC 227 is turned off, the output driver 112 of the battery protection IC 226 is turned off as well. The charge control signal output terminal 207 outputs the charge control signal to the gate of the charge control FET 202.

The gate voltage of the charge control FET 202 is pulled up by the resistor 204 to the charger voltage of the charger connected to the external terminal EB+. Accordingly, the charge control FET 202 is turned off, whereby the charge current is cut off. In this manner, when the charge control signal input terminal, the discharge control signal input terminal, the charge control signal output terminal, and the discharge control signal output terminal are used, detection signals detected by the voltage monitoring circuits are exchanged between the respective battery protection ICs, whereby charging is controlled.

Here, when the voltage of the charge control signal input terminal 215 is likely to increase to around the power supply voltage of the battery protection IC 227, if the battery protection IC 227 does not include the clamp circuit 121, a drain voltage of the output driver 112 (which is turned off) included in the battery protection IC 228 inevitably increases to around the power supply voltage of the battery protection IC 227. In other words, the battery voltages of the eight batteries, that is, the batteries 206e to 206l, are inevitably applied to the output driver 112 of the battery protection IC 228. As a result, there is required a high-breakdown-voltage battery protection IC capable of withstanding the battery voltages of the eight batteries, that is, the batteries 206e to 206l.

However, in the present invention, the clamp circuit 121 is provided in the battery protection IC 227, and hence the output driver 112 of the battery protection IC 228 is not applied with the battery voltages of the eight batteries, that is, the batteries 206e to 206l. Therefore, the high-breakdown-voltage battery protection IC capable of withstanding the battery voltages of the eight batteries, that is, the batteries 206e to 206l, is not required, but the battery protection IC capable of withstanding the battery voltages of four batteries is required.

When a voltage applied to the gate of the NMOS 122 is likely to become equal to or higher than a predetermined voltage, the clamp circuit 121 clamps the gate voltage of the NMOS 122 to the predetermined voltage. The circuit is designed so that the gate voltage (predetermined voltage) of the NMOS 122 becomes high at the time of clamping. In other words, the circuit is designed so that a voltage generated in the clamp circuit 121 at the time of the clamping is equal to or higher than the threshold voltage of the NMOS 122.

Next, a description is given of an operation of the battery device at the time of overdischarging.

The battery device can control discharging as well as charging.

As a result, the clamp circuit 121 is provided to the charge control signal input terminal and the discharge control signal input terminal of one battery protection IC, whereby the output driver 112 of the other battery protection IC connected to those terminals is not applied with a voltage equal to or higher than the breakdown voltage. Hence, the breakdown voltage of the battery protection IC is not required to be high, which prevents a manufacturing process from being complicated.

Further, when one type of battery protection IC is manufactured, the battery protection IC is applicable to both an electronic device (for example, laptop) which uses one battery protection IC and includes a battery number within the breakdown voltage of one battery protection IC, and an electronic device (for example, electric tool) which uses a plurality of battery protection ICs and includes a battery number within the breakdown voltage of one battery protection IC. In other words, the battery protection IC is applicable to any number of batteries connected in series. Accordingly, convenience of the battery protection IC is enhanced.

Further, the use of the charge control signal input terminal, the discharge control signal input terminal, the charge control signal output terminal, and the discharge control signal output terminal enables exchange of signals between the respective battery protection ICs, and thus the battery device does not need to include an IC for signal communication or a transistor, leading to a decrease in the number of components included in the battery device correspondingly.

Further, one battery protection IC can protect four batteries.

Further, even in a case where four or more batteries are provided, when a plurality of battery protection ICs are used, the plurality of battery protection ICs can protect four or more batteries.

It should be noted that four batteries are connected to one battery protection IC, but five or more batteries, or less than four batteries may be connected thereto. In this case, the voltage monitoring circuits are provided based on the number of batteries, and the control circuit 113 is designed based on the number of voltage monitoring circuits.

Further, three battery protection ICs are provided, but four or more, or less than three battery protection ICs may be provided.

Figure 3:
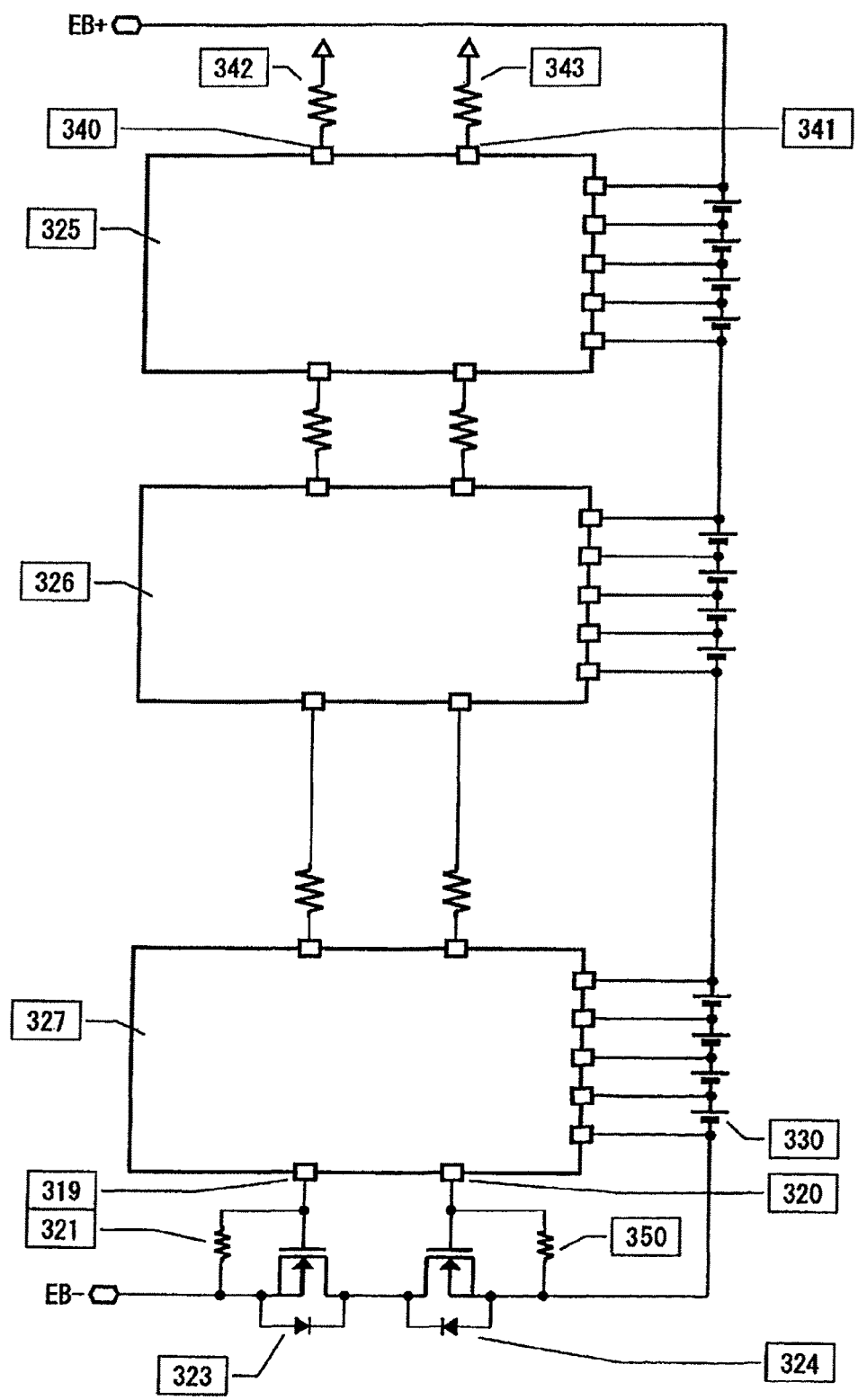
FIG. 3 is another diagram illustrating a battery device including a plurality of battery protection ICs connected in cascade.

Further, the p-type charge control FET 202 and the p-type discharge control FET 201 are used, but as illustrated in FIG. 3, an n-type charge control FET 323 and an n-type discharge control FET 324 may be used. In this case, the charge control FET 202 and the discharge control FET 201 are eliminated, and the charge control FET 323 and the discharge control FET 324 are provided between a negative terminal of a battery 330 and the external terminal EB−. A gate of the charge control FET 323 is connected to a charge control signal output terminal 319 of a battery protection IC 327 of the uppermost stage, and a gate of the discharge control FET 324 is connected to a discharge control signal output terminal 320 of the battery protection IC 327 of the uppermost stage. The resistor 204 is eliminated, a resistor 321 is provided between the gate of the charge control FET 323 and the external terminal EB−, the resistor 240 is eliminated, and a resistor 350 is provided between the gate of the discharge control FET 324 and the negative terminal of the battery 330. The resistor 223 is eliminated, and a resistor 342 is provided between a power supply terminal of a battery protection IC 325 and a charge control signal input terminal 340. The resistor 224 is eliminated, and a resistor 343 is provided between the power supply terminal of the battery protection IC 325 and a charge control signal input terminal 341. In this case, in the circuits provided for controlling charging and discharging, which are included in the battery protection ICs 325 to 327, the NMOS 112, NMOSs 119 and 120, and the NMOS 122 are replaced by PMOSs, and the clamp circuit 121 or the like is provided on the power supply terminal side.

Further, there may be added a diode (not shown) including an anode connected to the resistor 204 and a cathode connected to the charge control signal output terminal 207. As a result, at the time of overdischarging, for example, the discharge current is cut off in a current path through the positive terminal of the battery 206e, a ground terminal of the battery protection IC 226, a parasitic diode of the output driver 112 included in the battery protection IC 226, the charge control signal output terminal 207 of the battery protection IC 226, the resistor 204, the external terminal EB+, and the load.

Further, as in the case of the above, there may be added a diode (not shown) including a cathode connected to the resistor 321 and an anode connected to the charge control signal output terminal 319.

Further, the charge control signal input terminal 221 and the discharge control signal input terminal 222 are applied with the ground voltage of the battery protection IC 228 through the resistor 223 and the resistor 224, respectively, but may be input with the charge control signal and the discharge control signal from the outside, respectively.

Further, although not shown, as in the case of the above, the charge control signal input terminal 340 and the discharge control signal i terminal 341 are applied with a power supply voltage of the battery protection IC 325 through the resistor 342 and the resistor 343, respectively, but may be input with the charge control signal and the discharge control signal from the outside, respectively.

Further, in FIG. 2, an output circuit formed of the output driver included in the battery protection IC 226 of the uppermost stage is an open drain output circuit and is provided with the resistor 240. However, although not shown, the output circuit may be a CMOS output circuit, and the resistor 240 may be eliminated.

Further, in FIG. 3, an output circuit formed of an output driver included in the battery protection IC 327 of the uppermost stage is an open drain output circuit and is provided with the resistor 350. However, although not shown, the output circuit may be a CMOS output circuit, and the resistor 350 may be eliminated.

Industrial Applicability

The battery protection IC for protecting a battery and the battery device including a plurality of battery protection ICs mounted thereon are adaptable to any number of batteries connected in series, and therefore are applicable to a device which is operated with high voltage and is used with a battery, such as an electric tool.

The invention claimed is:

1. A battery protection IC for protecting a battery, comprising:
a charge control signal output terminal for outputting a charge control signal which controls charging from a charger to the battery;
a voltage monitoring circuit for monitoring a battery voltage of the battery, and detecting, when the battery voltage becomes equal to or higher than an overcharge detection voltage, that the battery voltage becomes equal to or higher than the overcharge detection voltage to output a detection signal;
an output driver of a first conductivity type for being turned off to cut off a charge current when the detection signal is output;
a charge control signal input terminal for receiving input of the charge control signal, the charge control signal input terminal being connected with a resistor in an outside thereof;
a transistor of the first conductivity type for being turned off when a voltage of the charge control signal input terminal is pulled to a source voltage side by a voltage generated in the resistor, and being turned on when the charge control signal input terminal is opened or HIGH is input to the charge control signal input terminal; and
a clamp circuit for clamping a gate voltage of the transistor to a predetermined voltage,
the output driver being turned on when the transistor is turned off, and being turned off when the transistor is turned on to cut off the charge current.

2. A battery protection IC according to claim 1, further comprising a plurality of the voltage monitoring circuits.

3. The battery protection IC according to claim 1, wherein the output driver is a NMOS transistor.

4. The battery protection IC according to claim 1, wherein the output driver comprises a transistor comprising a drain connected with the charge control signal output terminal.

5. The battery protection IC according to claim 1, further comprising a control circuit connected between the voltage monitoring circuit and the output driver.

6. The battery protection IC according to claim 1, wherein the transistor comprises a source connected with the charge control signal input terminal.

7. The battery protection IC according to claim 6, wherein the clamp circuit comprising an anode connected with the charge control signal input terminal and the source of the transistor.

* * * * *

UNITED STATES PATENT AND TRADEMARK OFFICE
CERTIFICATE OF CORRECTION

| | | |
|---|---|---|
| PATENT NO. | : 8,405,359 B2 | Page 1 of 1 |
| APPLICATION NO. | : 12/596269 | |
| DATED | : March 26, 2013 | |
| INVENTOR(S) | : Tange et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 505 days.

Signed and Sealed this
Second Day of December, 2014

Michelle K. Lee
*Deputy Director of the United States Patent and Trademark Office*